(12) United States Patent
Kijimoto et al.

(10) Patent No.: US 6,930,290 B2
(45) Date of Patent: Aug. 16, 2005

(54) HEATING COOKER FOR COMMERCIAL USE

(75) Inventors: Hideki Kijimoto, Nagoya (JP); Masamichi Suzumura, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/889,846

(22) Filed: Jul. 13, 2004

(65) Prior Publication Data

US 2005/0011881 A1 Jan. 20, 2005

(30) Foreign Application Priority Data

Jul. 15, 2003 (JP) ........................................ 2003-274391

(51) Int. Cl.$^7$ ................................................ H05B 1/02
(52) U.S. Cl. .......................................... 219/506; 705/1
(58) Field of Search ................................ 219/385, 386, 219/391, 398, 401, 411, 482, 485, 486, 489, 490, 492, 506, 710, 720; 126/21 A; 700/2, 211, 177, 236; 99/324–328, 330; 705/1, 15

(56) References Cited

U.S. PATENT DOCUMENTS

| | | | |
|---|---|---|---|
| 4,437,159 A | 3/1984 | Waugh | |
| 4,636,949 A | 1/1987 | Longabaugh | |
| 4,663,710 A | 5/1987 | Waugh et al. | |
| 4,672,540 A | 6/1987 | Waugh et al. | |
| 4,742,455 A | 5/1988 | Schreyer | |
| 4,812,963 A * | 3/1989 | Albrecht et al. | 700/2 |
| 4,858,119 A | 8/1989 | Waugh et al. | |
| 4,913,038 A | 4/1990 | Burkett et al. | |
| 4,920,948 A * | 5/1990 | Koether et al. | 126/21 A |
| 5,186,097 A | 2/1993 | Vaseloff et al. | |
| 5,331,575 A * | 7/1994 | Koether et al. | 219/492 |
| 5,398,597 A | 3/1995 | Jones et al. | |
| 5,596,514 A | 1/1997 | Maher, Jr. et al. | |
| 5,688,422 A | 11/1997 | Landwehr et al. | |
| 5,875,430 A * | 2/1999 | Koether | 705/1 |
| 6,750,433 B2 * | 6/2004 | Guenther et al. | 219/506 |
| 6,777,652 B2 * | 8/2004 | Stockley | 219/486 |
| 2002/0082924 A1 * | 6/2002 | Koether | 705/15 |
| 2003/0034342 A1 * | 2/2003 | Stockley | 219/486 |

FOREIGN PATENT DOCUMENTS

WO 01/22780 A1 3/2001

* cited by examiner

*Primary Examiner*—Tu Hoang
(74) *Attorney, Agent, or Firm*—Burr & Brown

(57) ABSTRACT

A heating cooker for commercial use is provided in which heating control is conducted based on cooking parameter according to each cooking menu and an unauthorized user is prevented from changing the cooking parameter easily. In the heating cooker, cooking parameter can be changed only when a password is entered. Moreover, a user's administration level is determined by the entered password and information which can be changed is selected according to the user's administration level. The password entry can be carried out not only in an operation display panel provided with the heating cooker but in a remote central monitoring system which operates the heating cooker from a distant place.

12 Claims, 6 Drawing Sheets

HEATING COOKER FOR COMMERCIAL USE

BACKGROUND OF THE INVENTION

This application claims the benefit of Japanese Patent Application Number 2003-274391 filed Jul. 15, 2003, the entirety of which is incorporated by reference.

1. Field of the Invention

The present invention relates to a heating cooker for commercial use which conducts heating control according to each cooking menu.

2. Description of Related Art

Conventionally, heating cookers such as fryers used in fast food restaurants, have a structure where cooking parameter such as cooking time and cooking temperature is set according to each cooking menu in order to notify termination of cooking at an appropriate time.

As shown in FIG. 3, a fryer 1 has a casing 2, which includes an oil vat 3 filled with cooking oil for frying foods (hereinafter, simply referred to as oil), a pulse burner 5 is provided within the oil vat 3 for heating the oil.

This fryer 1 has a cooking controller 10 for frying foods according to each cooking menu.

The cooking controller 10 has an operation display panel 20 with which a user conducts cooking operations, and a microcomputer 100 which stores a heating control program for each cooking menu item and controls heating operation according to user's instructions through the operation display panel 20.

As shown in FIG. 4, the operation display panel 20 has an operation button 19 for switching start/end of the heating operation of the fryer, cooking menu buttons B1–B12 with which the user can select various cooking menus, a changeover switch B13 for alternating displays of the display portion, and a display panel 30 for displaying information such as a cooking menu, time, etc.

The microcomputer 100 stores cooking parameter such as cooking temperature and cooking time for each cooking menu item. Based on the stored parameter, the microcomputer conducts heating control of the oil.

A system and method of operating the fryer 1, while the fryer carries out a previously set cooking menu (hereinafter, this condition is referred to as "normal mode"), will be briefly explained.

First, when the operation button 19 is pushed after oil is poured into the oil vat 3, the pulse burner 5 starts combustion to heat the oil. Then the microcomputer 100 maintains oil temperature at a set temperature based on an output signal from a temperature sensor 23 provided with the oil vat 3.

Then when one of the cooking menu buttons B1–B12 is pushed after foods are placed in a cooking basket, the microcomputer 100 starts a cooking timer to start heat cooking according to the selected menu button. When cooking is finished, an alarm device sounds to notify the user.

As described above, as heat cooking can be conducted with only selecting a predetermined cooking menu on the operation display panel 20 in the normal mode, foods are cooked in the consistent condition regardless of the user and standardized foods can be always served in fast food restaurants, etc.

Further, other than carrying out a cooking menu which is previously set, a new cooking menu can be set and cooking parameter for the existing cooking menu can be changed in the fryer 1.

Further, the fryer 1 has a configuration where these additional setting or change of cooking parameter (hereinafter, this condition is referred to as "program mode") can be carried out on the operation display panel 20.

However, a problem can occur in this program mode, that is, if the cooking parameter can be easily changed in a program mode, the cooking quality can not be maintained at a certain level.

In order to solve the problem, U.S. Pat. No. 5,398,597 discloses a fryer in which a program mode is usually locked, and only accessible when a pair of buttons on an operation display panel 20 is pushed for a predetermined time.

The above configuration prevents an inadvertent change of cooking parameter by a user's inappropriate operation.

In addition, when a method for accessing the program mode is kept secret from unauthorized users, it prevents the unauthorized users from changing the parameter easily.

However, the above technology still has some problems. First, as operation to access the program mode is simple, it is easy for all users to find out how to access the program mode by watching the operation. Moreover, the operation to access the program mode is unchangeable.

Specifically, even an unauthorized user can easily access to the program mode when he watches his supervisor's operation, and he can change the cooking parameter of each cooking menu any number of times.

Moreover, operation to access to the program mode is carried out only on the operation display panel. Due to this, a supervisor who is in charge of a plurality of stores has to visit all the stores in order to change the cooking parameter concerning each cooking menu of all the stores.

SUMMARY OF THE INVENTION

In order to solve this problem, in accordance with a first aspect of the present invention, a heating cooker for commercial use includes a storage portion for storing cooking parameter for each cooking menu, an operation portion for selecting a cooking menu stored in the storage portion and changing cooking parameter stored in the storage portion, a heating control portion for controlling heating of foods according to cooking parameter stored in the storage means when a certain cooking menu is selected in the operation portion, a prohibition means for prohibiting changes of the cooking parameter stored in the storage means by the operation portion, and a release means for releasing the prohibition by the prohibition means for changing the cooking parameter. The release means includes a password entry portion for entering a password, and a password verification portion for checking the entered password with a password previously stored therein. Further, prohibition of the change of the cooking parameter is released in the password entry portion when the entered password coincides with the password previously stored in the password verification portion.

A heating cooker for commercial use in accordance with a second aspect of the present invention, there is provided a heating cooker for commercial use according to the first aspect, wherein a transmitting/receiving portion is provided which transmits/receives information to/from a remote central monitoring system which monitors a plurality of heating cookers from a central place, wherein entry of the password and the change of the cooking parameter are carried out from the remote central monitoring system.

A heating cooker for commercial use in accordance with a third aspect of the present invention, there is provided a heating cooker for commercial use according to the first or second aspect, wherein the operation portion further includes a plurality of selective buttons, and the order of pushing the buttons is determined to be a password.

A heating cooker for commercial use in accordance with a fourth aspect of the present invention, there is provided a heating cooker for commercial use according to the third aspect, wherein each selective button is assigned a cooking menu number according to each cooking menu, and the password is entered when the selective buttons having the cooking menu numbers are pushed.

A heating cooker for commercial use in accordance with a fifth aspect of the present invention, there is provided a heating cooker for commercial use according to the first aspect, further comprising a release information limiting means in which an administration level of a user is determined based on the entered password and information to be released from the prohibition means is limited according to the user's administration level.

A heating cooker for commercial use in accordance with a sixth aspect of the present invention, there is provided a heating cooker for commercial use according to the fifth aspect, wherein the release information limiting means can change a password of another user whose administration level is below a predetermined level when it is determined that a user whose administration level is above the predetermined level operates the heating cooker.

A heating cooker for commercial use in accordance with a seventh aspect of the present invention, there is provided a heating cooker for commercial use according to the fifth aspect, wherein the release information limiting means can change limitation of the information to be released from the prohibiting means, to another user whose administration level is below a predetermined level, when it is determined that a user whose administration level is above the predetermined level operates the cooking heater.

A heating cooker for commercial use in accordance with an eighth aspect of the present invention, there is provided a heating cooker for commercial use according to the first aspect, wherein the password verification portion stores the number of times of entry of a password or a period of use of the same for each password, and the password verification portion requires the user to change his password when the password is entered a predetermined number of times or the password has been used over a predetermined period.

A heating cooker for commercial use in accordance with a ninth aspect of the present invention, there is provided a heating cooker for commercial use according to the eighth aspect, wherein if a user does not change his password even when password change is required, information which the user can read or change is limited.

A heating cooker for commercial use in accordance with a tenth aspect of the present invention, there is provided a heating cooker for commercial use according to the first aspect, the heating cooker for commercial use includes a history storing means which stores entry time of a password and an operation history for each password and a history display means which displays information stored in the history storing means.

In a heating cooker for commercial use recited in a first aspect having the above configuration, the prohibition means prohibits change of cooking parameter stored in the storage portion for each cooking menu. Moreover, a release means releases the prohibition only when a user carries out a predetermined operation.

Specifically, when a predetermined password is entered into the password entry portion, the password verification portion checks the entered password with the previously stored password. Then, prohibition means is released when the both passwords coincide with each other.

In this way, as the cooking parameter can be changed only when a predetermined password is entered, the cooking parameter is not easily changed. As a result, excellent security can be maintained. That is, it is possible to prevent without fail an inadvertent change of the cooking parameter by user's wrong operation, and further a problem that the unauthorized users change the parameter easily is solved. Therefore, foods are cooked in the consistent condition because the cooking parameter is almost fixed, whereby cooking quality can be maintained at a certain level.

In a heating cooker for commercial use recited in a second aspect having the above configuration, the transmitting/receiving portion transmits/receives information to/from the remote central monitoring system which monitors a plurality of heating cookers from the central place. Further, entry of the password and change of the cooking parameter are carried out from the remote central monitoring system.

In this way, as entry of the password or the cooking parameter can be carried out from the remote central monitoring system, a supervisor who is in charge of a plurality of stores can change cooking parameters all at one time without visiting all the stores, which is costly and inefficient.

In addition, changing the cooking parameter can be conducted not only in the remote central monitoring system located at a distant place but also in an operation display panel on site. As a result, a flexible change according to a situation can be carried out.

In a heating cooker for commercial use recited in a third aspect having the above configuration, the operation portion includes a plurality of buttons which are also used as the password entry portion. Then the order of pushing the buttons is determined to be a password.

In this way, buttons for changing the cooking parameters are also used for entering the password, so that it is unnecessary to provide buttons for entering the password separately, which is efficient in terms of space and cost.

Moreover, an unauthorized user can not easily find out that the buttons of the operation portion are used for entering password. Therefore, an improper change of the cooking parameter etc. by unauthorized users is prevented without fail at small cost.

In a heating cooker for commercial use recited in a fourth aspect having the above configuration, numbers applied to the selective buttons on the operation display panel according to the cooking menus correspond to numbers of a password. In other words, combination of cooking menu numbers corresponds to the password.

Therefore, the user has only to push the buttons in order while watching the numbers recited on the selective buttons of the operation display panel, so that he can enter the password easily as if he typed it on the keyboard of a personal computer.

In a heating cooker for commercial use recited in a fifth aspect having the above configuration, the release information limiting means determines an administration level of a user based on the entered password, and information to be released from the prohibition means is limited according to the user's administration level.

Because of this, it is possible for the user to control change of the cooking parameter according to his administration level.

In a heating cooker for commercial use recited in a sixth aspect having the above configuration, the releasing information limiting means can change a password of another user whose administration level is below a predetermined level when it is determined that a user whose administration level is above the predetermined level operates the heating cooker.

In this way, as the user whose administration level is above the predetermined level is authorized to change the password of a user whose administration level is below the predetermined level, excellent security can be maintained.

For example, when a user with a low administration level conducts a dishonest act such as leaking parameter of a cooking menu to a competitive company, another user with a higher administration level changes a password of the user with a low administration level for invalidation of the former password. As a result, the user cannot read the cooking parameter any more, so that leaking of information to the competitive company can be prevented.

In a heating cooker for commercial use recited in a seventh aspect having the above configuration, the release information limiting means can change limitation of the information which can be read or changed by another user whose administration level is below a predetermined level, when an administration level judging means determines that a user whose administration level is above the predetermined level operates the heating cooker.

In this way, as the user whose administration level is above the predetermined level is authorized to limit the information which can be read or changed by another user whose administration level is below the predetermined level, security concerning cooking information such as cooking parameter can be excellent.

In a heating cooker for commercial use recited in the eighth aspect having the above configuration, the password verification portion stores the number of times of entry of a password or a period of use of the same for each password, and the password verification portion requires a user to change his password when the password is entered a predetermined number of times or the password has been used over a predetermined period.

In this way, the password can be changed periodically according to the number of times of entry or the period of use. Therefore, even if an unauthorized user steals a look at the password to change cooking parameter etc., the password becomes invalid after it is entered a predetermined number of times or used for a predetermined period, which prevents serious damage.

In a heating cooker for commercial use recited in the ninth aspect having the above configuration, if a user does not change his password even when change is required, information which the user can read or change is limited.

By doing this, the password is changed periodically without fail, whereby security concerning cooking information such as cooking parameter can be improved.

In a heating cooker for commercial use recited in the tenth aspect having the above configuration, the history storing means stores entry time of a password and a history of operation for each password, and the history display means displays information stored in the history storing means.

Because of this, it is possible to grasp a history of setting, and change of setting can be monitored, whereby cooking parameter is not easily changed.

DESCRIPTION OF THE PREFERRED EMBODIMENTS

The configuration and operation of the present invention will become clearer through the following description of preferred embodiments of a heating cooker for commercial use of the present invention.

[First Embodiment]

Figure 3:
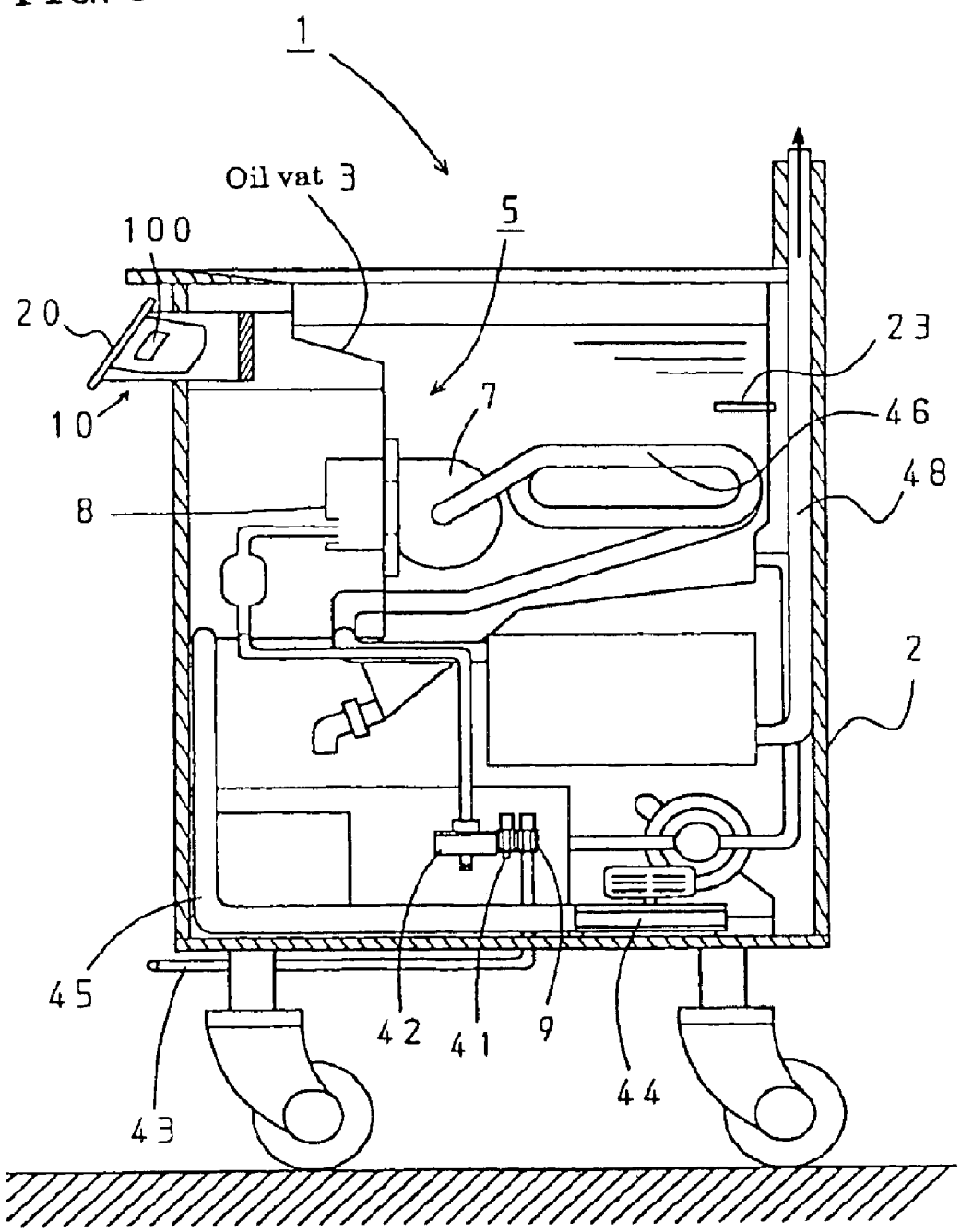
FIG. 3 is an explanation view of a fryer of an embodiment.

FIG. 3 is an overall explanation view of a fryer according to an embodiment of the heating cooker for commercial use.

As shown in FIG. 3, a fryer 1 has a casing 2, which includes an oil vat 3 filled with cooking oil for frying foods, a pulse burner 5 provided in the oil vat 3 for heating the oil, a temperature sensor 23 for detecting temperature of the oil in the oil vat 3, and an oil tank 6 which temporarily stores the oil in order to filter the oil in the oil vat 3.

The pulse burner 5 has a combustion chamber 7 provided in the oil vat 3 and a mixing chamber 8 that communicates with the combustion chamber 7 outside of the oil vat 3. The mixing chamber 8 is connected to a gas pipe 43 for supplying a fuel gas provided with, from the upstream side, an intake solenoid valve 9, a main solenoid valve 41, and a gas governor 42. The mixing chamber 8 is also connected to an air supply conduit 45 with which a blower 44 is provided for supply of fresh air for combustion. Further, the combustion chamber 7 is communicated with a tail pipe 46 extending through the oil vat 3, and the tail pipe 46 is connected to exhaust pipe 48, that opens to the outside of the casing 2 at the outside of the oil vat 3.

Further, the fryer 1 has a cooking controller 10 which controls combustion of the pulse burner 5 according to each cooking menu.

The cooking controller 10 includes an operation display panel 20 with which a user conducts cooking operation and where information is displayed, and a microcomputer portion 100 which stores a heating control program according to each cooking menu and conducts heating control when it receives instructions from the operation display panel 20.

The cooking controller 10 is connected with a speaker for sounding an alarm (not shown) and the aforementioned temperature sensor 23. Moreover, it is connected with the intake solenoid valve 9, the main solenoid valve 41, and the blower 44 of the pulse burner 5.

Figure 4:
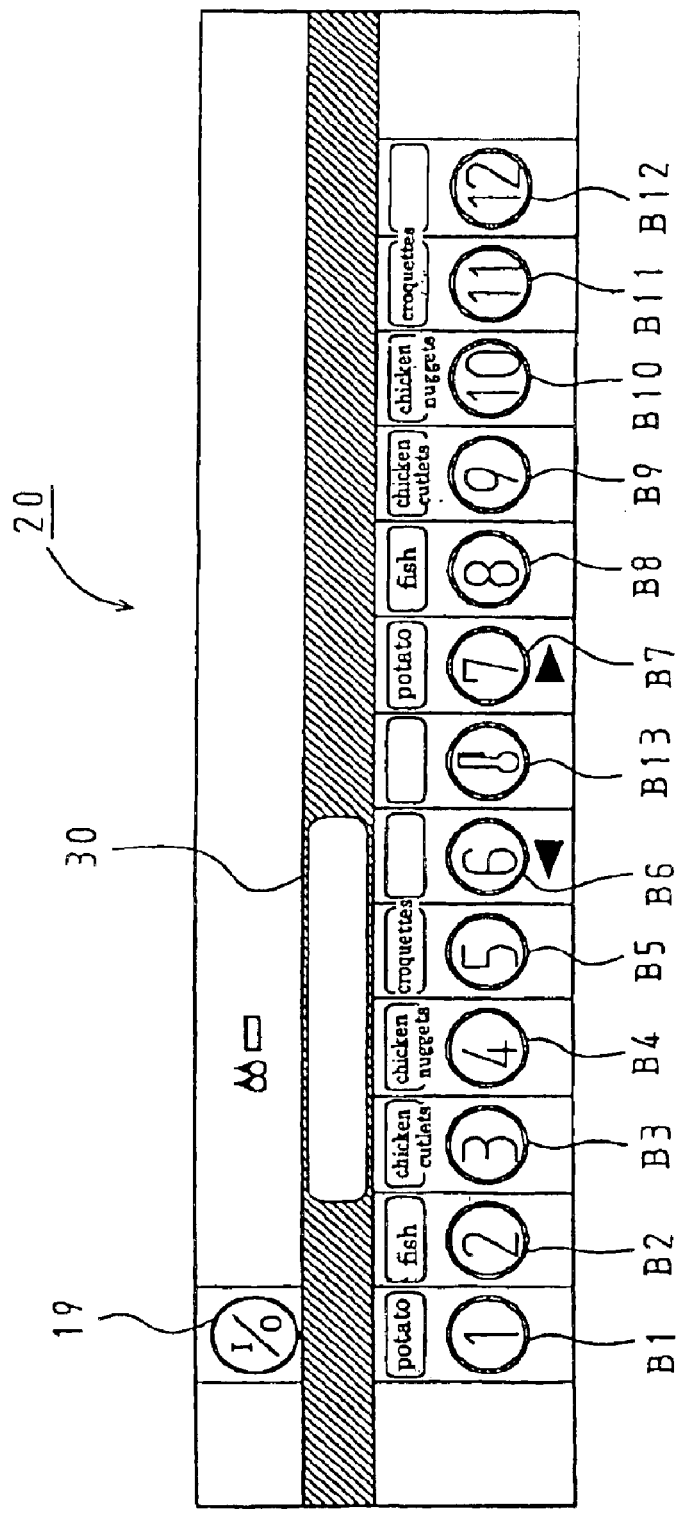
FIG. 4 is a front view of an operation display panel of the embodiment.

The operation display panel 20, provided in front of the casing 2, includes an operation portion 21 and a display panel 30 as shown in FIG. 4.

The display panel 30 displays information such as cooking menus or set cooking time.

The operation portion 21 includes an operation button 19 which switches start/end of heating operation of the fryer, a changeover switch B13 for alternating displays of the display panel 30, menu buttons B1–B12 for starting a cooking timer according to each cooking menu.

Each of the buttons B1–B12 has a cooking menu at the upper portion thereof and has a menu number at the center thereof respectively. In addition, an LED is installed at the backside of the operation button 19, the changeover button B13 and each of the buttons B1–B12, respectively, and when each of the above buttons is pushed the LED is lighted.

The microcomputer 100 stores cooking parameter such as cooking temperature and cooking time according to each cooking menu. Based on the cooking parameter, the microcomputer 100 controls heating of the oil.

It should be noted that the cooking parameter stored in the microcomputer 100 is usually locked, that is, changes of the cooking parameter are prohibited. This lock is released only when a password is entered on the operation display panel 20, which will be explained later.

Next, the workings and an operation method of the fryer 1 for a previously set cooking menu will be briefly explained.

First, oil is filled into the oil vat 3, and once the operation button 19 on the operation display panel 20 is pushed, the pulse burner 5 starts combustion to heat the oil. Then, the microcomputer 100 maintains oil temperature at a setting level according to each cooking menu.

After putting foods into a basket, when one of the menu buttons B1–B12 according to a predetermined cooking menu is pushed on the operation display panel 20, the cooking timer starts to count a previously set cooking time.

The microcomputer 100 continuously monitors cooking oil temperature by the temperature sensor 23 during the operation of the fryer. It also controls combustion on/off of the pulse burner 5 based on a signal from the temperature sensor 23. Moreover, cooking time can be adjusted according to the difference between a set temperature and a detected temperature. When cooking is finished, an alarm device sounds to notify the user.

In a normal mode, cooking parameter for each cooking menu such as cooking temperature or cooking time is locked to be unchangeable. However, when a predetermined operation is carried out on the operation display panel 20 provided in the fryer 1, the cooking parameter can be changed (that is, entry into a program mode).

Hereinafter, a method to release a lock of the cooking parameter for entering the program mode will be explained using FIGS. 1 and 4.

Figure 1:
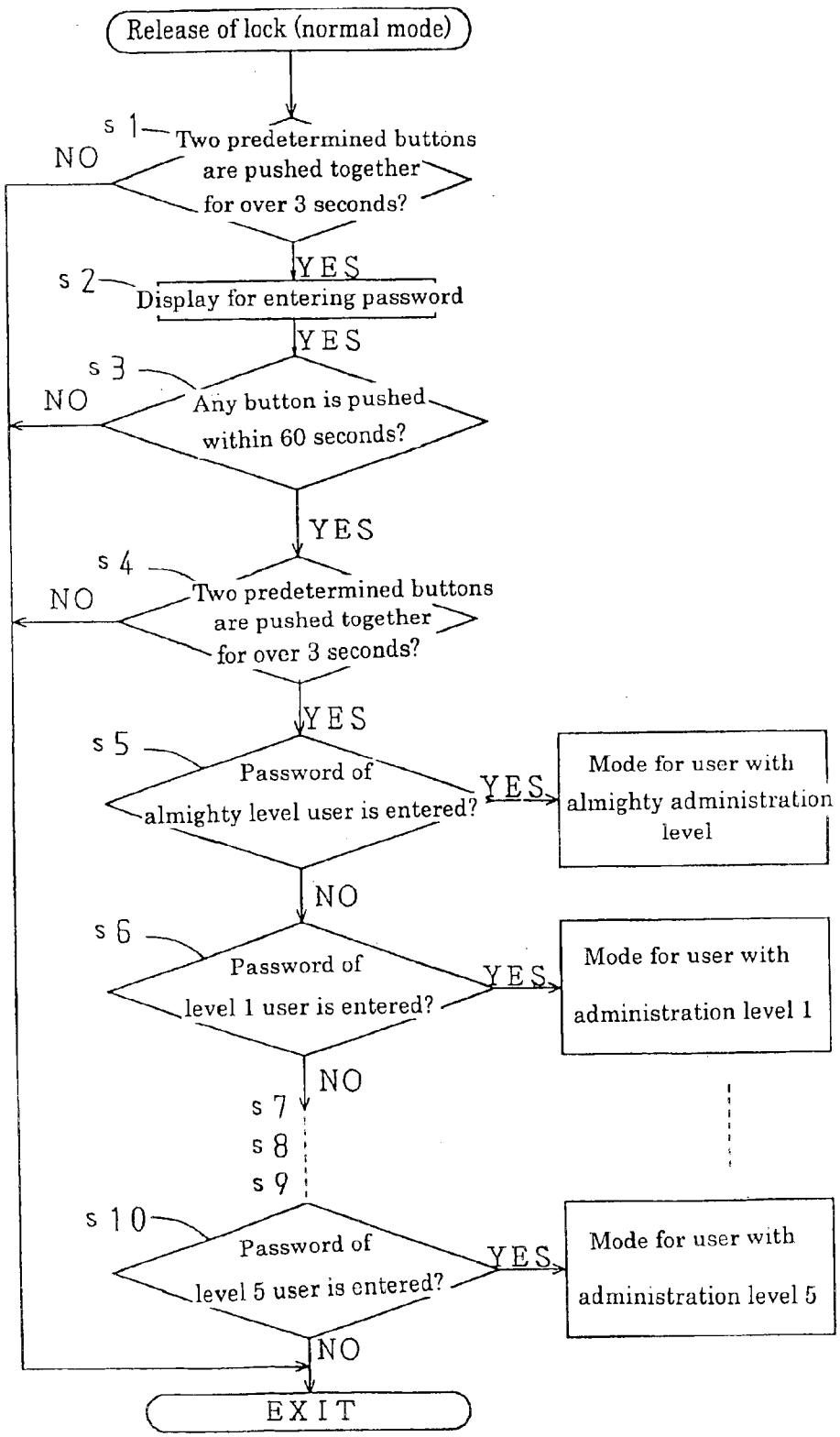
FIG. 1 is a flow chart showing operation of a fryer of a first embodiment.

FIG. 1 is a flow chart of releasing the lock of the cooking parameter in the first embodiment.

First, when a user continues to push predetermined menu buttons on the operational display panel 20 (for example, B6 and B7) together for over 3 seconds (S1) in a normal mode, a display which requires an entry of his password appears on the display panel 30 (S2).

After the password requirement was displayed, if no buttons on the operation display panel 20 are pushed by the user within 60 seconds, the microcomputer 100 exits a lock release operation routine (S3). On the other hand, when the menu buttons B1–B12 on the operation display panel 20 are pushed by the user as his password and the password is confirmed (for example, pushing B6 and B7 together for over 3 seconds) (S4), it goes to a password verification mode.

The order of pushing the buttons on the operation display panel 20 is determined to be a password.

For example, when a password is set as "1977," the user pushes buttons on the operation display panel 20 in the order of B1, B9, B7, B7, and finally, B6 and B7 are pushed together. When the buttons are pushed in this manner, it is determined that the password is entered correctly.

In this way, the user can enter the password easily by pushing the menu buttons in the order of the password while watching the numbers assigned on the buttons.

Moreover, an administration level of the user is also determined when a password is verified.

Specifically, there are five administration levels, which are, from higher to lower, an almighty level, a level 1, a level 2, a level 3, a level 4, a level 5, and each user's password is previously stored and classified into one of the above levels. When a password is entered, the password is verified and classified into one of the administration levels from the almighty level to the level 5 (S5–S10). Then it goes to a program mode corresponding to the administration level.

When the entered password is not verified, the password is determined to be invalid, and the microcomputer 100 exits the lock release operation routine.

It should be noted that when a password is verified in S5–S10 of the lock release operation routine, whether or not the entered password expires is determined before it goes to the program mode. If the password expires, change of the password is required and it goes to a password renewal routine.

Figure 2:
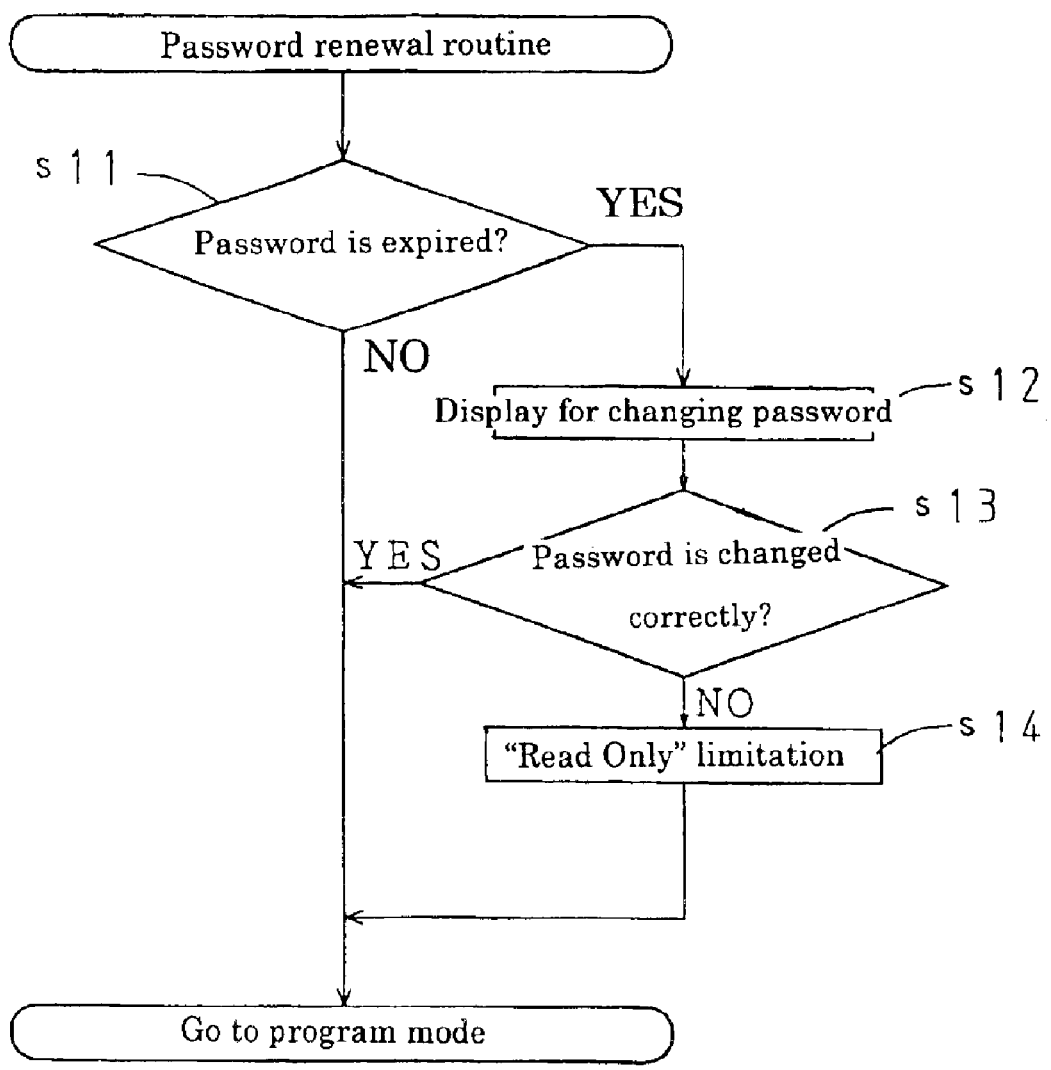
FIG. 2 is a flow chart showing operation of a fryer of the first embodiment.

The password renewal routine will be explained using a flowchart of FIG. 2.

First, whether or not the verified password expires is determined (S11).

In detail, the number of times that the password is entered and how long it has been since the latest renewal are detected. When the number of times of the password's entry is below a predetermined number and a period since the latest renewal is within a predetermined period, it is determined that the password has not expired, and it goes to the program mode where information can be read or changed. On the other hand, when the number of times of the password's entry is over a predetermined number of times or a period since the latest renewal is over a predetermined period in S11, the expiration of the password is determined, and change of the password is required on the display panel 30 (S12).

Here, determination whether or not the password expires is based on both the number of times that the password is entered and the time period since the latest renewal. However, the determination can be carried out based on only one of the above.

When the password is changed correctly according to a predetermined procedure, it goes to the program mode (S13). On the other hand, when the password is not changed correctly (for example, the same password or an invalid password is entered, or the password is not changed according to a predetermined procedure), a "Read Only" limitation is carried out in which change of setting is locked and thus only reading information is allowed (S14), and it goes to the program mode.

In the program mode, information which can be changed or read is set according to each administration level. The information is as follows:

1. A cooking profile (cooking time, cooking temperature, cooking adjustment function, etc. for each cooking menu)
2. Setting of a utensil (switching of a temperature display (Centigrade or Fahrenheit), setting a clock, switching of a display language)
3. Information of a utensil (maintenance information (an error history (only read)), a product number (only read), contact information, etc.)
4. An access history (each user's program change history, for example, date and time, number of times, and contents in accessing to the program mode etc.)

5. A password of another user whose administration level is below a user's administration level
6. An administration level of another user whose administration level is below a user's administration level
7. Information which can be changed by another user whose administration level is below a user'S administration level A user whose administration level is almighty can change all of the above information, and as a user's administration level becomes lower, information which can be changed is limited.

For example, information which can be read or changed by a user with administration level 5 is limited as follows.
3. Information of a utensil
   maintenance information (only read), a product number (only read), contact information
5. A password of himself When it goes to the program mode, information which can be changed or read is displayed on the display panel 30.

In the program mode, by operating the menu buttons B1–B12 on the operation display panel 20, cooking parameter for example can be changed.

Hereinafter, an operation method in the program mode will be explained, using an example of "changing a password of another user whose administration level is below the user's administration level."

In the program mode, when a user pushes the menu buttons B6 or B7, information which can be changed appears on the display panel 30 in order. Next, a changeover button 13 is pushed when a display of "5. Change of a password" appears on the display panel 30. Then, a password to be changed is required to be entered on the display panel 30.

Then the user enters an arbitrary password using the menu buttons B1–B12. When the entered password is a password of another user whose administration level is below the user's administration level, it is determined the password is changeable, and entry of a corrected password is required on the display panel 30. On the other hand, when the entered password is a password of another user whose administration level is above the user's administration level, it is determined that the password is unchangeable, and reentry is required. If an unchangeable password is entered three times, it is determined that operation is invalid and the microcomputer 100 exits the program mode to return to the normal mode.

On the other hand, when it is determined that the entered password is changeable, the user types a corrected password using the menu buttons B1–B12 and confirms the password (for example, pushing B1 and B12 together for over 1 second). Then the password is changed and at the same time it exits the program mode to enter the normal mode.

It should be noted that upon entering the normal mode the program mode is automatically locked.

That is, if the user wishes to change cooking parameter again, he has to release the lock of the program mode.

An operation method to change other settings is similar to the method above. For example, when a user attempts to add or delete information which can be changed by another user whose administration level is below the user's administration level, first he selects "7. Information Change" on the display panel 30. Thereafter, he enters a password of an arbitrary user using the menu buttons B1–B12 and selects arbitrary information on the display panel 30.

Similar to the password change, upon entering the normal mode from the program mode, the program mode is automatically locked.

Further, a history of change of settings is stored in the microcomputer 100 for each password.

According to a fryer of the first embodiment, the order of pushing the buttons on the operation display panel is determined to be a password and information such as cooking parameter can be changed only when a predetermined password is entered. As a result, the information is not easily changed compared to a conventional fryer.

Thus, it is possible to prevent without fail an inadvertent change of the information by user's wrong operation. Further, a problem that the unauthorized users change the cooking parameter easily is solved. Therefore, foods are cooked in the consistent condition because the cooking parameter is almost fixed, whereby cooking quality can be maintained at a certain level.

Moreover, the menu buttons are also used for entering a password, so that it is unnecessary to provide special buttons for entering the password, which is efficient in terms of space and cost. Further, an unauthorized user can not easily find out that the buttons of the operation portion are used for entering a password.

This prevents without fail the unauthorized user from improperly changing the cooking parameter etc. at small cost.

In addition, a number (that is, a number for each cooking menu) is applied to each of the menu buttons, and a user can enter a password while watching the numbers on the menu buttons. Therefore, the user can easily enter the password as if he typed it on the keyboard of a personal computer.

Also, as changeable information is limited according to a user's administration level, it is possible for the user to control change of the cooking parameter according to his administration level.

In addition, as only the user whose administration level is above the predetermined level is authorized to change a password of another user whose administration level is below the predetermined level and to limit the information which can be read or changed by the another user, security concerning cooking information such as cooking parameter can be excellently achieved.

Further, a password can be changed periodically according to the number of times of entering or a period since the latest renewal. Therefore, even if an unauthorized user steals a look at another user's password or a user with a lower administration level steals a look at a password of another user with a higher administration level, the password becomes invalid after a predetermined period, which prevents serious damage.

Moreover, if a user does not change his password even when password change is required, limitation is imposed on the user, for example, he cannot change information in the program mode. By doing this, the password is changed periodically without fail, whereby security concerning cooking information such as cooking parameter can be improved.

In addition, since information change is stored and read in the program mode, it is possible to grasp a history of the settings and changes to the settings can be monitored. Therefore, the cooking parameter etc. is not easily changed.

[Second Embodiment]

Next, the second embodiment of a heating cooker for commercial use will be explained using FIG. 5.

In this heating cooker for commercial use of the second embodiment, release of a lock, change of a password, and change of a cooking program can also be carried out on a remote operation portion 51 provided with a remote central monitoring system 50, in addition to the operation display panel 20 of the fryer used in the first embodiment.

Figure 5:
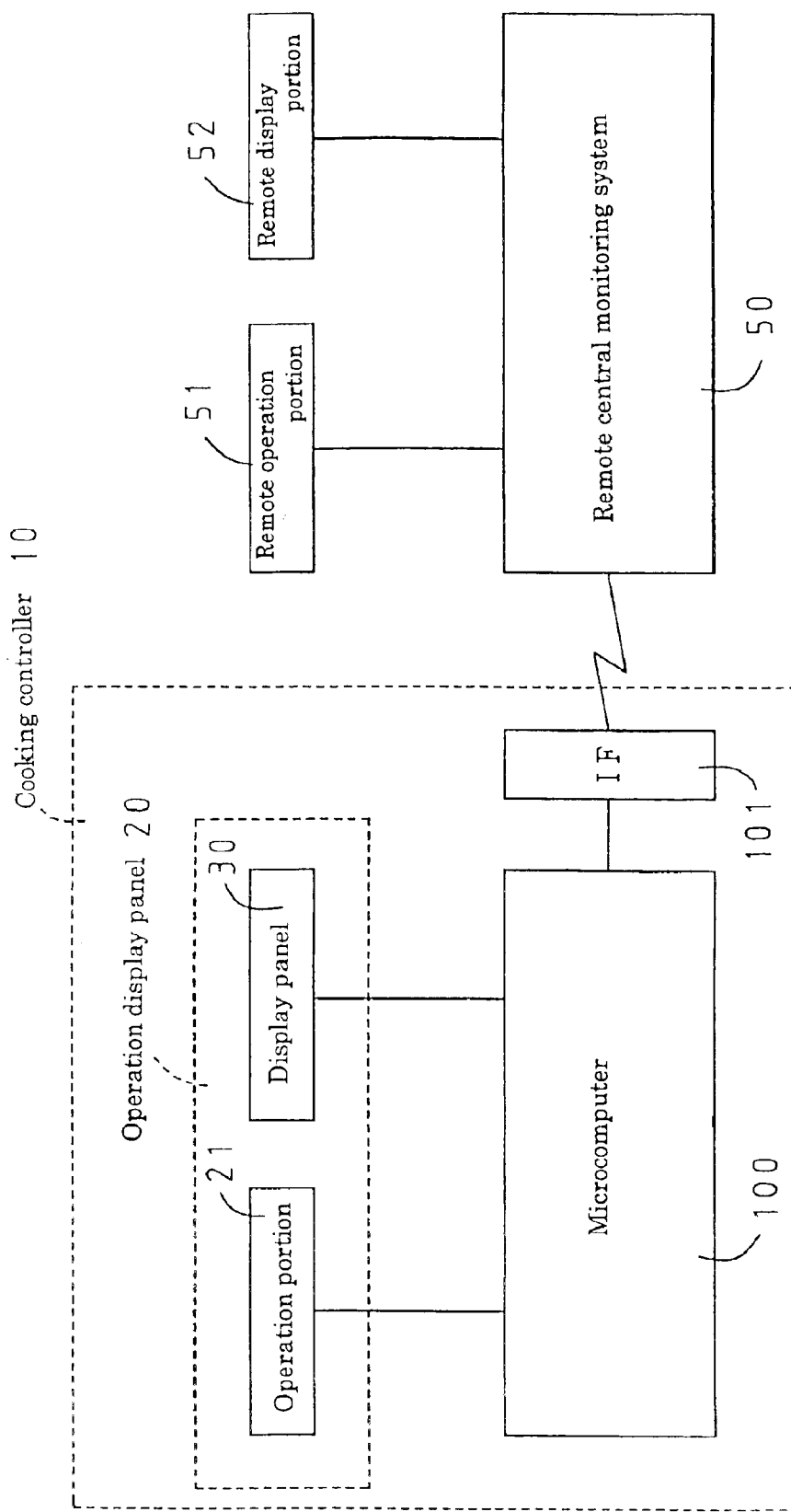
FIG. 5 is a block diagram showing structure of a fryer of a second embodiment.

As shown in FIG. 5, a fryer 1 of the second embodiment includes a microcomputer 100 having an interface IF for communicating with devices outside of the fryer. The remote central monitoring system 50 is connected with the interface IF through a communications circuit. Therefore, information such as cooking parameter can be transmitted or received between the interface IF and the remote central monitoring system 50.

The remote central monitoring system 50 is installed in a center which supervises each stores having the fryer 1. The remote central monitoring system 50 has the remote operation portion 51 in which a user located at a distant place can change cooking parameter stored in a storing portion, and has a remote display portion 52 which displays information in the microcomputer.

Figure 6:
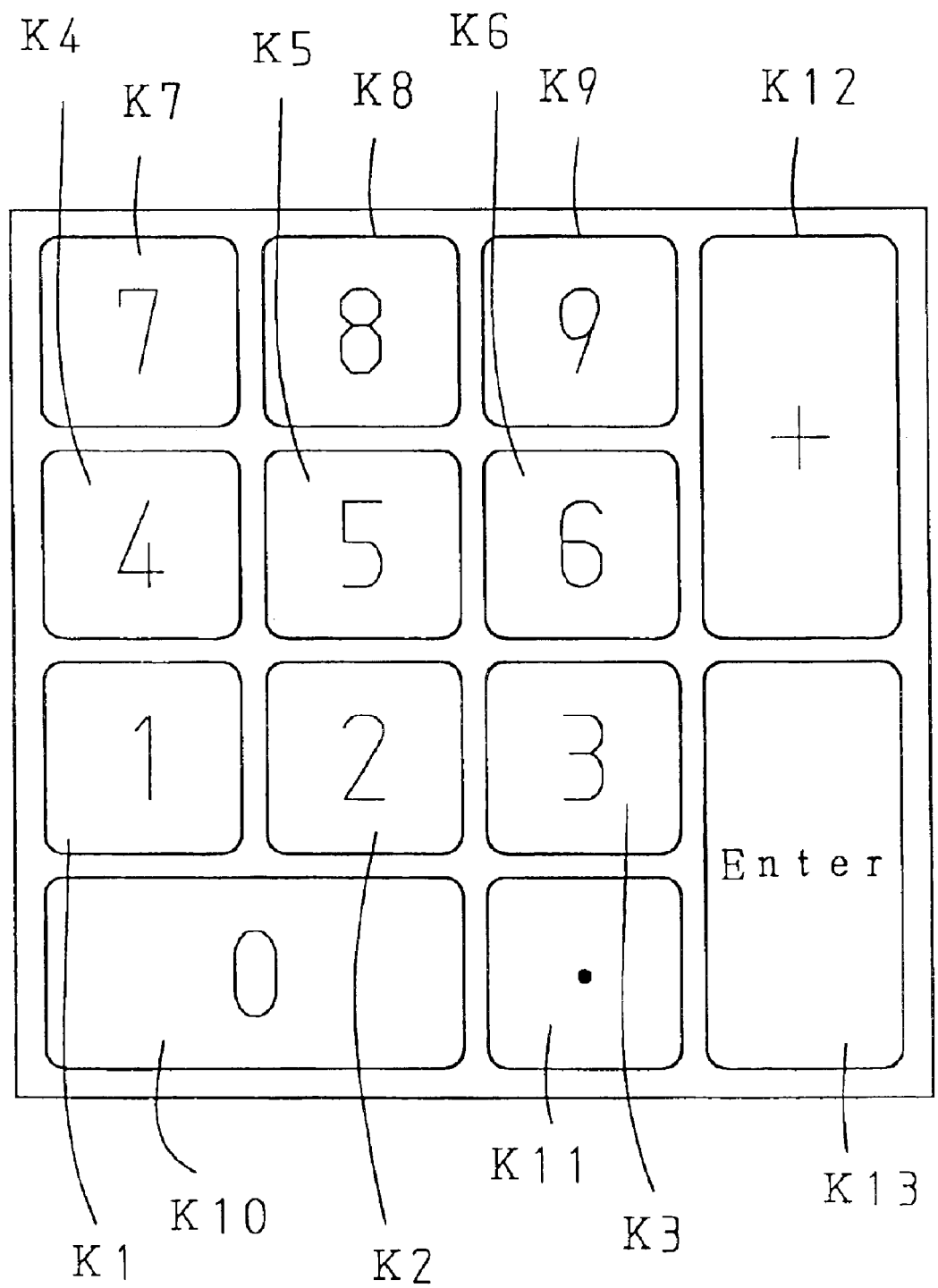
FIG. 6 is an explanation view of a remote operation portion of a fryer of the second embodiment.

As shown in FIG. 6, the remote operation portion 51 includes a plurality of keys K1–K13 each of which has a number or an alphabet letter at its center. The numbers on the keys K1–K10 correspond to that of the menu buttons B1–B10 on the operation display panel 20 respectively, and the Keys K11–K13 correspond to the menu buttons B11–B13.

Next, an operation method of the remote operation portion 51 will be explained, using an example of release of a lock with reference to FIGS. 1 and 6.

A flowchart of the release of a lock is the same as that of the first embodiment.

First, a user continues to push predetermined keys together (for example, K6 and K7 which correspond to B6 and B7 in the first embodiment) on the remote operation portion 51 for over 3 seconds (S1). Then, a display to require entering the user's password appears on the remote display portion 52 (S2).

After the password requirement is displayed, if no button on the operation display panel 20 is pushed by the user within 60 seconds, the microcomputer 100 exits a lock release operation routine (S3). When the user pushes any button on the operation display panel 20 (that is, inputs a password) and carries out a predetermined procedure for confirming the password (for example, pushing B6 and B7 together for over 3 seconds), it goes to a password verification mode (S3).

The order of pushing the buttons on the remote operation portion 51 is determined to be a password.

For example, when a password is set as "1977" similar to the first embodiment, the user pushes buttons on the remote operation portion 51 in the order of K1, K9, K7, k7. When the buttons are pushed in this manner, it is determined that the password is entered correctly.

Moreover, an administration level of the user is also determined when the password is verified.

Specifically, there are five administration levels, which are, from higher to lower, an almighty level, a level 1, a level 2, a level 3, a level 4, a level 5, and each user's password is previously stored and classified into one of the above levels. When a user's password is entered, the entered password is verified and classified into one of the administration levels from the almighty level to the level 5 (S5–S10). Then it goes to a program mode corresponding to the administration level.

When the entered password is not verified, the password is determined to be invalid, and the microcomputer 100 exits the lock release operation routine.

When a password is entered in the remote operation portion 51, entry into the program mode is possible only on the remote operation portion 51. On the other hand, in order to enter the program mode on the operation display panel 20, release of a lock on the operation display panel 20 is necessary.

According to the fryer of the second embodiment, the following effects are provided in addition to the effects of the first embodiment.

First, information management can be carried out from a distant place and a supervisor who is in charge of a plurality of stores can change the cooking programs at one time without visiting all the stores, which is costly and inefficient.

In addition, changing the cooking program can be carried out not only in the remote central monitoring system but also on the operation display panel 20 provided with a heating cooker on site. As a result, the change of the cooking program can be carried out efficiently.

The above description of embodiments of the present invention has in no way been provided for the purpose of limiting the present invention, and it is of course possible to diversely embody the present invention within the scope not departing from the essential points of the present invention.

As an example of an altered embodiment, information which can be changed in the program mode is not limited to the embodiments, for example, a user with an almighty level may add or delete the information which can be changed.

Moreover, it is not necessary to provide 13 menu buttons on the operation display panel for changing settings as disclosed in the embodiments. Less than 13 buttons are acceptable, and further, other than a number or a menu, a cartoon character or an arrow may be applied on the buttons.

In addition, administration levels are not limited to six including the almighty level, and information which can be changed or read according to the administration level is not limited to that of the embodiments.

The present invention may be applied to not only a fryer but an oven or a broiler.

What is claimed is:

1. A heating cooker for commercial use comprising:
   a storage portion for storing cooking parameter for each cooking menu;
   an operation portion for selecting a cooking menu stored in the storage portion and changing cooking parameter stored in the storage portion;
   a heating control portion for controlling heating of foods according to the cooking parameter stored in the storage portion when a certain cooking menu is selected in the operation portion;
   a prohibition means for prohibiting changes of the cooking parameter stored in the storage portion by the operation portion, and
   a release means for releasing the prohibition with the prohibition means as to the change of the cooking parameter,
   wherein the release means includes a password entry portion for entering a password, and a password verification portion for checking the entered password with a password previously stored therein,
   wherein prohibition of the change of the cooking parameter with the prohibition means is released when the entered password coincides with the password previously stored in the password verification portion.

2. A heating cooker for commercial use as claimed in claim 1, wherein a transmitting/receiving portion is provided which transmits/receives information to/from a remote central monitoring system which monitors a plurality of heating cookers from a central place, and entry of the password and the change of the cooking parameter are carried out from the remote central monitoring system.

3. A heating cooker for commercial use as claimed in claim 1, wherein the operation portion further includes a plurality of selective buttons, and the order of pushing the buttons is determined to be a password.

4. A heating cooker for commercial use as claimed in claim 2, wherein the operation portion further includes a plurality of selective buttons, and the order of pushing the buttons is determined to be a password.

5. A heating cooker for commercial use as claimed in claim 3, wherein each selective button is assigned a cooking menu number according to each cooking menu, and the password is entered when the selective buttons having the cooking menu numbers are pushed.

6. A heating cooker for commercial use as claimed in claim 4, wherein each selective button is assigned a cooking menu number according to each cooking menu, and the password is entered when the selective buttons having the cooking menu numbers are pushed.

7. A heating cooker for commercial use as claimed in claim 1, further comprising a release information limiting means in which an administration level of a user is determined based on the entered password, and information to be released from the prohibition means is limited according to a user's administration level.

8. A heating cooker for commercial use as claimed in claim 7, wherein the release information limiting means can change a password of another user whose administration level is below a predetermined level when it is determined that a user whose administration level is above the predetermined level operates the heating cooker.

9. A heating cooker for commercial use as claimed in claim 7, wherein the release information limiting means can change limitation of the information to be released from the prohibiting means, to another user whose administration level is below a predetermined level, when it is determined that a user whose administration level is above the predetermined level operates the heating cooker.

10. A heating cooker for commercial use as claimed in claim 1, wherein the password verification portion stores the number of times of entry of a password or a period of use of the same for each password, and the password verification portion requires the user to change his password when the password is entered a predetermined number of times or the password has been used over a predetermined period.

11. A heating cooker for commercial use as claimed in claim 10, wherein if a user does not change his password even when password change is required, information which the user can read or change is limited.

12. A heating cooker for commercial us as claimed in claim 1, further comprising:

a history storing means which stores entry time of a password and an operation history for each password, and a history display means which displays information stored in the history storing means.

* * * * *